US008396911B2

(12) United States Patent
Oguro

(10) Patent No.: US 8,396,911 B2
(45) Date of Patent: Mar. 12, 2013

(54) DATA PROCESSING DEVICE

(75) Inventor: Akiyoshi Oguro, Kawasaki (JP)

(73) Assignee: Toshiba Information Systems (Japan) Corporation, Kanagawa (JP)

( * ) Notice: Subject to any disclaimer, the term of this patent is extended or adjusted under 35 U.S.C. 154(b) by 543 days.

(21) Appl. No.: 12/680,826

(22) PCT Filed: Sep. 25, 2008

(86) PCT No.: PCT/JP2008/067299

§ 371 (c)(1),
(2), (4) Date: Mar. 30, 2010

(87) PCT Pub. No.: WO2009/047983

PCT Pub. Date: Apr. 16, 2009

(65) Prior Publication Data

US 2010/0211622 A1 Aug. 19, 2010

(30) Foreign Application Priority Data

Oct. 10, 2007 (JP) ................................ 2007-264965

(51) Int. Cl.
*G06F 17/15* (2006.01)
*G06F 7/50* (2006.01)
*G06F 7/52* (2006.01)

(52) U.S. Cl. ......................... 708/230; 708/422; 708/523

(58) Field of Classification Search ........................ None
See application file for complete search history.

(56) References Cited

U.S. PATENT DOCUMENTS 5,600,753 A * 2/1997 Iso ................................ 704/200

(Continued)

FOREIGN PATENT DOCUMENTS

JP 10-171988 6/1998
JP 2004-157614 6/2004

(Continued)

OTHER PUBLICATIONS

International Search Report issued by the Japanese Patent Office on Jan. 6, 2009, for International Patent Application No. PCT/JP2008/067299.

*Primary Examiner* — Ilwoo Park
(74) *Attorney, Agent, or Firm* — Finnegan, Henderson, Farabow, Garrett & Dunner, L.L.P.

(57) ABSTRACT

In a determination as to similarity on parts of a piece of data, high-speed processing is performed without the need for a database. Division signal lines (L1 to Lk) that transmit signals corresponding to division data are used. The following components each of which is composed of a logical circuit are provided: a correlation matrix generation circuit (12) which calculates an average value on the signals of each of the division signal lines (L1 to Lk) and generates a correlation matrix signal forming a correlation matrix on each division; a characteristic value/characteristic vector calculation circuit (14) which calculates signals corresponding to a characteristic value and a characteristic vector of the correlation matrix; a second product-sum operation circuit (15) which calculates a signal corresponding to a feature vector of each division; distance calculation circuits (16-1 to **16-*k*) which calculate distances between individual elements of the feature vector; a threshold setting circuit (17) for setting a signal of a threshold that is compared with the distances between the individual elements; and result output circuits (18-1 to 18-*k*) which compare, based on the threshold signal, distance signals between the individual elements calculated by the distance calculation circuits (16-1 to 16-*k***) and output a signal.

3 Claims, 10 Drawing Sheets

U.S. PATENT DOCUMENTS

| | | | | |
|---|---|---|---|---|
| 6,345,109 | B1 | 2/2002 | Souma et al. | |
| 6,671,404 | B1 * | 12/2003 | Kawatani et al. | 382/190 |
| 2006/0069955 | A1 | 3/2006 | Oka et al. | |
| 2007/0183629 | A1 * | 8/2007 | Porikli et al. | 382/103 |
| 2010/0202707 | A1 * | 8/2010 | Costache et al. | 382/224 |

FOREIGN PATENT DOCUMENTS

| | | |
|---|---|---|
| JP | 2006-79479 | 3/2006 |
| JP | 2007-80061 | 3/2007 |

* cited by examiner

F I G. 2
( a )
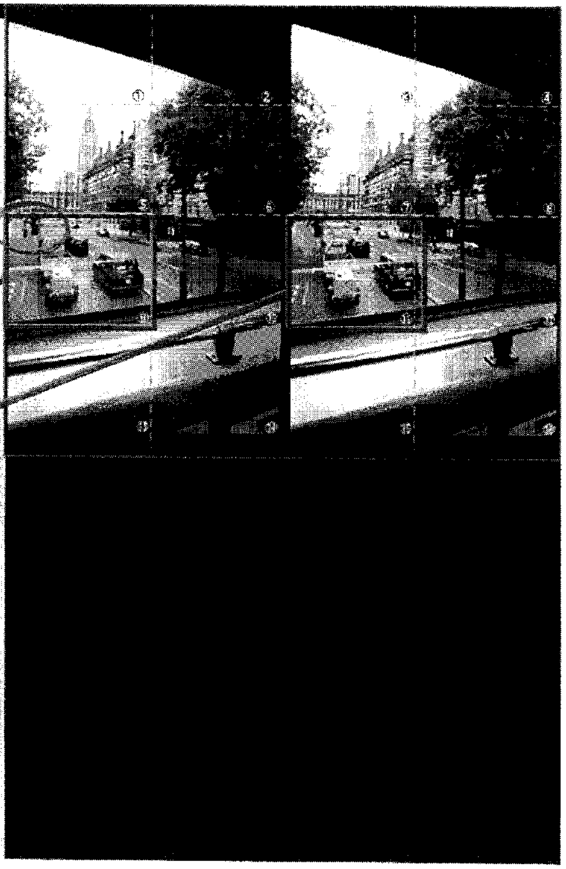
( b )
| | Pic1 | Pic2 | Pic3 | Pic4 | Pic5 | Pic6 | Pic7 | Pic8 | Pic9 | Pic10 | pic11 | Pic12 | Pic13 | Pic14 | Pic15 | Pic16 |
|---|---|---|---|---|---|---|---|---|---|---|---|---|---|---|---|---|
| Pic1 | 255 | 255 | 0 | 255 | 255 | 255 | 255 | 255 | 255 | 255 | 255 | 255 | 255 | 255 | 255 | 255 |
| Pic2 | 255 | 255 | 255 | 0 | 255 | 255 | 255 | 255 | 255 | 255 | 255 | 255 | 255 | 255 | 255 | 255 |
| Pic3 | 0 | 255 | 255 | 255 | 255 | 255 | 255 | 255 | 255 | 255 | 255 | 255 | 255 | 255 | 255 | 255 |
| Pic4 | 255 | 0 | 255 | 255 | 255 | 255 | 255 | 255 | 255 | 255 | 255 | 255 | 255 | 255 | 255 | 255 |
| Pic5 | 255 | 255 | 255 | 255 | 255 | 255 | 0 | 255 | 255 | 255 | 255 | 255 | 255 | 255 | 255 | 255 |
| Pic6 | 255 | 255 | 255 | 255 | 255 | 255 | 255 | 0 | 255 | 255 | 255 | 255 | 255 | 255 | 255 | 255 |
| Pic7 | 255 | 255 | 255 | 255 | 0 | 255 | 255 | 255 | 255 | 255 | 255 | 255 | 255 | 255 | 255 | 255 |
| Pic8 | 255 | 255 | 255 | 255 | 255 | 0 | 255 | 255 | 255 | 255 | 255 | 255 | 255 | 255 | 255 | 255 |
| Pic9 | 255 | 255 | 255 | 255 | 255 | 255 | 255 | 255 | 255 | 255 | 25 | 255 | 255 | 255 | 255 | 255 |
| Pic10 | 255 | 255 | 255 | 255 | 255 | 255 | 255 | 255 | 255 | 255 | 255 | 0 | 255 | 255 | 255 | 255 |
| pic11 | 255 | 255 | 255 | 255 | 255 | 255 | 255 | 255 | 25 | 255 | 255 | 255 | 255 | 255 | 255 | 255 |
| Pic12 | 255 | 255 | 255 | 255 | 255 | 255 | 255 | 255 | 255 | 0 | 255 | 255 | 255 | 255 | 255 | 255 |
| Pic13 | 255 | 255 | 255 | 255 | 255 | 255 | 255 | 255 | 255 | 255 | 255 | 255 | 255 | 255 | 0 | 255 |
| Pic14 | 255 | 255 | 255 | 255 | 255 | 255 | 255 | 255 | 255 | 255 | 255 | 255 | 255 | 255 | 255 | 0 |
| Pic15 | 255 | 255 | 255 | 255 | 255 | 255 | 255 | 255 | 255 | 255 | 255 | 255 | 0 | 255 | 255 | 255 |
| Pic16 | 255 | 255 | 255 | 255 | 255 | 255 | 255 | 255 | 255 | 255 | 255 | 255 | 255 | 0 | 255 | 255 |

DATA PROCESSING DEVICE

TECHNICAL FIELD

The present invention relates to a data processing device that performs processing on various types of data such as an image and sound with an eigenspace method. More particularly, the invention relates to a data processing device which is composed of a logic circuit and improves speed.

BACKGROUND ART

In conventional data processing using the eigenspace method, for example, several images that are subjected to pattern recognition are compared with a database, and a common threshold for similarity is used.

For example, there is known a method which, when comparing a face photograph with an input face image, improves the method described above to extract features by separating a model space from a variation space (see patent document 1).

However, the data processing is not performed in terms of whether there is a portion similar to an image on one sheet or a series of sounds (such as an image or a word) or whether there is a portion different from an image on a sheet or a series of sounds (such as an image or a word).

In this type of data processing, a characteristic value and a characteristic vector related to the result of analysis of a main ingredient of each piece of data are often calculated in advance and stored in a database. Moreover, also in comparison data, its main ingredient is calculated from the characteristic value and the characteristic vector stored in the database.

For example, there is known a behavior analysis device which stores, in a database, the average value of a feature vector, a covariance matrix and a characteristic value matrix and a characteristic vector of the covariance matrix and uses them. (see patent document 2 (in particular, see claim 6)).

Patent document 1: Japanese Patent Application the KOKAI Publication No. H10-171988

Patent document 2: Japanese Patent Application the KOKAI Publication No. 2004-157614

Disadvantageously, however, it is impossible to simultaneously perform, on division data (data obtained by dividing an image) and the like, processing for calculating the characteristic value and the characteristic vector and the analysis of a main ingredient in a real-time manner.

DISCLOSURE OF THE INVENTION

Problems to be Solved by the Invention

The present invention is made in view of the current state of the data processing using the foregoing eigenspace method, and an object thereof is to provide a data processing device which can extract desired partial data by performing a determination as to similarity or dissimilarity on parts of a piece of data and can perform high-speed processing without the need for a database.

Means to Solve the Problems

According to the present invention, there is provided a data processing device including: a division signal line for transmitting a signal corresponding to division data obtained by dividing data to be processed into sizes for comparison; a correlation matrix generation circuit which is composed of an OR circuit and an AND circuit, receives the signal of the division signal line, and calculates an average value on the signals of each division signal line, and which also generates, based on a calculated average value signal of each division and the signal of the division signal line, a correlation matrix signal forming a correlation matrix on each division; a characteristic value/characteristic vector calculation circuit which is composed of a logical circuit, receives the correlation matrix signal generated by the correlation matrix generation circuit and the signal of the division signal line, and calculates signals corresponding to a characteristic value and a characteristic vector of the correlation matrix; a product-sum operation circuit which is composed of an OR circuit and an AND circuit, receives a characteristic vector signal calculated by the characteristic value/characteristic vector calculation circuit and the signal of the division signal line, and calculates a signal corresponding to a feature vector of each division; a distance calculation circuit which is composed of a logical circuit, receives a feature vector signal calculated by the product-sum operation circuit, and calculates distances between individual elements of the feature vector; a threshold setting circuit for setting a signal of a threshold that is compared with the distances between the individual elements; and a result output circuit which is composed of a logical circuit, compares, based on the threshold signal set by the threshold setting circuit, distance signals between the individual elements calculated by the distance calculation circuit, and outputs a signal indicating whether or not an interval has a corresponding distance.

The data processing device according to the present invention further includes: a minimum distance extraction circuit which is composed of a logical circuit, receives the distance signals between the individual elements calculated by the distance calculation circuit, and extracts a minimum distance on each element of each division, characterized in that the result output circuit compares a signal of the distance extracted by the minimum distance extraction circuit with the threshold signal to output a signal indicating whether or not the interval has a corresponding distance.

The data processing device according to the present invention further includes: a processing circuit that outputs, based on an output of the result output circuit, data of a division that is the interval having the corresponding distance.

Effects of the Invention

According to the present invention, data to be processed is divided into sizes for comparison, a feature vector is extracted for each of the divided divisions, and the distances between individual elements of the feature vector is calculated and compared with the distances between the individual elements, resulting in that it is possible to perform a determination as to similarity, dissimilarity and the like on parts of a piece of data. In this case, each circuit is composed of a logical circuit, and thus it is possible to perform high-speed processing.

Moreover, a threshold that is compared with the distances between the individual elements can be set, each element having the corresponding distance is determined based on the set threshold and the division corresponding to this element is specified, resulting in that it is possible to freely extract part of a piece of data that controls the threshold to fall within a desired range of similarity.

With respect to the calculated distances between the individual elements, the minimum distance on each element is extracted for each division, the extracted distance is compared with the threshold, each element having the corresponding distance is determined and a division corresponding to this element is specified, resulting in that it is possible to select a part having the highest similarity for each part of a piece of data. Furthermore, when the part has a predetermined degree of similarity, the specification is performed, and thus it is possible to perform, with more strict criteria, a determination as to similarity, dissimilarity and the like on parts of a piece of data. Even in this case, each circuit is composed of a logical circuit, and thus it is possible to perform high-speed processing.

DESCRIPTION OF THE PREFERRED EMBODIMENTS

Examples of a data processing device according to the present invention will be described below with reference to the accompanying drawings. In the drawings, like constituent elements are identified with common reference numbers, and their description will not be repeated.

EXAMPLE 1

In FIG. 1, a block diagram of a data processing device according to a first example is shown. The data processing device is provided with an input portion 11 for receiving data, where a piece of data is received.

The input portion 11 may receive data from a data storage device or the like; data obtained by storing data incoming in a real time may be input to the input portion 11 as a piece of data. Here, a piece of data refers to data for an image on one sheet or sound data recorded in a lecture or the like. As a specific example, the data of an image shown in FIG. 2(*b*) can be picked up. The data received through the input portion 11 can be represented by $\{I_0, \ldots, I_i\}$. In the image of FIGS. 2(*a*) and 2(*b*), color brightness data (R, G, B) per pixel corresponds to $\{I_0, \ldots, I_i\}$, and one image is composed of i pixels.

The input portion 11 includes division signal lines L1 to Lk. The division signal lines L1 to Lk are signal lines for transmitting signals corresponding to division data obtained by dividing the data into sizes of divisions in which to compare data to be processed. The data that is divided into several sizes of divisions is fed to the division signal lines L1 to Lk. In the example of FIG. 2(*a*), the division data obtained by equally dividing one image into k (16) portions, namely, division images Pic•1 to Pic•k (k=16) is input.

In the data of the division images Pic•1 to Pic•k (k=16), the data of the division image Pic•1 can be represented by $\{A_{11}, \ldots, A_{j1}\}^T$, the data of the division image Pic•2 can be represented by $\{A_{12}, \ldots, A_{j2}\}^T, \ldots$, and the data of the division image Pic•k (k=16) can be represented by $\{A_{1k}, \ldots, A_{jk}\}^T$. The letter T indicates that this is a transposed matrix. By this division, j=i/k. Since k=16, the image of one division includes j pixels.

Each element $A_{xy}$ of $\{A_{11}, \ldots, A_{j1}\}^T$, $\{A_{12}, \ldots A_{j2}\}^T, \ldots$, and $\{A_{1k}, \ldots, A_{jk}\}^T$ represents brightness data (R, G, B) of one pixel. When the data of the division images Pic•1 to Pic•k (k=16) is represented by a matrix with j rows and k columns, the matrix shown in FIG. 3 is obtained. When a group of elements in the column direction is represented by A1, A2, . . . , and Ak, the signals of the elements A1, A2, . . . , and Ak are input to the corresponding signal lines of the division signal lines L1 to Lk. Hence, each of the division signal lines L1 to Lk is composed of a plurality of lines corresponding to the bits of data.

The signal that has passed through the division signal lines L1 to Lk is fed to a correlation matrix generation circuit 12 and a product-sum operation circuit 15. The correlation matrix generation circuit 12 is composed of an OR circuit and an AND circuit, receives the signals of the division signal lines L1 to Lk and calculates the average value of the signal of each of the division signal lines L1 to Lk. This correlation matrix generation circuit 12 calculates the average value of the elements in the same row included in each piece of division data (here, image). A formula for obtaining the average value $M_j$ of the elements $\{A_{j1}, \ldots, A_{j1}\}$ in a general j row (jth row) can be expressed by (formula 1) below. An average value calculating portion of the correlation matrix generation circuit 12 for performing calculation on (formula 1) is formed by combining known adder circuits and divider circuits composed of logical circuits.

[Formula 1]

$$M_j = \frac{A_{j1} + A_{j2} + \ldots + A_{jk}}{k} \qquad \text{(Formula 1)}$$

The average value $M_j$ obtained by the average value calculating portion of the correlation matrix generation circuit 12 is used for the following processing in the correlation matrix generation circuit 12. This correlation matrix generation circuit 12 is configured as, for example, a circuit for generating a covariance matrix. The correlation matrix generation circuit 12 receives the previously calculated average value signal of each division and the signals of the division signal lines L1 to Lk, and generates a covariance matrix signal representing the covariance matrix of each division. Specifically, when the result of a subtraction performed on the elements $\{A_{11}, \ldots, A_{1j}\}$ in the general j row (jth row) using the average value $M_j$ is represented by $Q_{jk}$, a covariance $S_{kk}$ can be determined by (formula 2) below. Here, $Q_{jk}^T$ represents the transposed matrix of $Q_{jk}$. The correlation matrix generation circuit 12 that performs calculation on (formula 2) is formed by combining known subtractor circuits and multiplier circuits composed of logical circuits.

[Formula 2]

$$Q_{jk}=A_{jk}-M_j \; S_{kk}=Q_{jk}^T \cdot Q_{jk} \qquad \text{(Formula 2)}$$

The output of the correlation matrix generation circuit 12 is fed to a characteristic value/characteristic vector calculation circuit 14. The characteristic value/characteristic vector calculation circuit 14 receives a correlation matrix signal generated by the correlation matrix generation circuit 12 and the signals of the division signal lines L1 to Lk, and calculates signals corresponding to the characteristic value and the characteristic vector of the correlation matrix. The characteristic value/characteristic vector calculation circuit 14 is composed of: a circuit that is composed of a logical circuit for obtaining the solution of a kth degree formula using the elements of the correlation matrix by performing a known computation; and a circuit that is composed of a logical circuit for obtaining the characteristic vector using the above-mentioned solution and the elements of the correlation matrix. The characteristic value/characteristic vector calculation circuit 14 determines characteristic values $\lambda_1$ to $\lambda_k$ and a characteristic vector V of a covariance $S_{kk}$. The characteristic vector V can be expressed by (formula 3).

[Formula 3]

$$\lambda_1, \lambda_2, \ldots,$$

$$V = \begin{bmatrix} V_{11} & \cdots & V_{1k} \\ \vdots & \ddots & \vdots \\ V_{k1} & \cdots & V_{kk} \end{bmatrix} \quad \text{(Formula 3)}$$

The output of the characteristic value/characteristic vector calculation circuit 14 is fed to the product-sum operation circuit 15. The product-sum operation circuit 15 is composed of an OR circuit and an AND circuit, receives a characteristic vector signal calculated by the characteristic value/characteristic vector calculation circuit 14 and the signals of the division signal lines L1 to Lk and calculates a signal corresponding to the feature vector of each division. Specifically, the product-sum operation circuit 15 uses the characteristic vector V of (formula 3), the above-mentioned $A_{jk}^T$ and $A_{jk}$ to calculate a formula $(A_{jk}\cdot V)^T\cdot A_{jk}$ and thus obtain the feature vector. Since the calculated feature vector is a matrix with k rows and k columns as with (formula 4) shown below, the elements aligned in the row direction of (formula 4) are collected, and thus the feature vectors c1 to ck are obtained. That is, $c1=\{c_{11}, \ldots, c_{k1}\}^T$, $c2=\{c_{12}, \ldots, c_{k2}\}^T, \ldots,$ and $ck=\{c_{1k}, \ldots, c_{kk}\}^T$ are obtained.

[Formula 4]

$$\begin{matrix} c1 & \text{———} & ck \end{matrix}$$

$$\begin{bmatrix} C_{11} & \cdots & C_{1k} \\ \vdots & \ddots & \vdots \\ C_{k1} & \cdots & C_{kk} \end{bmatrix} = (Q_{jk}\cdot V)^T \cdot Q_{jk} \quad \text{(Formula 4)}$$

The output of the product-sum operation circuit 15 is fed to distance calculation circuits 16-1, . . . , 16-*i*, . . . , and 16-*k*. The distance calculation circuits 16-1, . . . , 16-*i*, . . . , and 16-*k* calculate distances between the individual elements of the feature vectors c1 to ck. In this example, when the distances between the individual elements are $d_{mn}$, a Euclidean distance is determined by (Formula 5) below.

[Formula 5]

$$d_{mn} = |C_m - C_n| = \sqrt{\sum_{i=1}^{k} (c_{im} - c_{in})} \quad \text{(Formula 5)}$$

$$m = 1, \ldots, k$$
$$n = 1, \ldots, k$$
$$m \neq n$$

In FIG. 4, the input and output and the computation within the circuit performed by the distance calculation circuits 16-1 and 16-*k* among the distance calculation circuits 16-1 to 16-*k* are shown. The distance calculation circuits 16-1, . . . , 16-*i*, . . . , and 16-*k* are individually composed of a logical circuit for performing the computation shown in FIG. 4. When the Euclidean distances thus determined are represented by a matrix, it is a matrix with k rows and k columns shown in (formula 6) below.

[Formula 6]

$$\begin{bmatrix} d_{MAX} & d_{12} & d_{13} & \cdots & d_{1k} \\ d_{21} & d_{MAX} & d_{23} & & d_{2k} \\ & d_{32} & d_{MAX} & & d_{3k} \\ \vdots & \vdots & \vdots & \ddots & \vdots \\ d_{k1} & d_{k2} & d_{k3} & \cdots & d_{kk} \end{bmatrix} \quad \text{(Formula 6)}$$

The outputs of the distance calculation circuits 16-1, . . . , 16-*i*, . . . , and 16-*k* are fed to result output circuits 18-1 to 18-*k*. A threshold setting circuit 17 is connected to the result output circuits 18-1 to 18-*k*. The threshold setting circuit 17 sets a threshold to compare distances (the Euclidean distances) between the individual elements, and can be composed of a register. The result output circuits 18-1 to 18-*k* are composed of a logical circuit. They compare, based on the threshold set by the threshold setting circuit 17, the distances between the individual elements calculated by the distance calculation circuits 16-1 to 16-*k*, and output a plurality of signals indicating whether the division is an interval having the corresponding distance.

These result output circuits 18-1 to 18-*k* have the same configuration, and a configuration corresponding to one input in one of the result output circuits is shown in FIG. 5. When a lower threshold set by the threshold setting circuit 17 is assumed to a lower threshold a and a higher threshold is assumed to a higher threshold b, the following components are provided: a comparator 31 composed of a logical circuit for detecting $a<d_{mn}$; a comparator 32 composed of a logical circuit for detecting $b>d_{mn}$; and an AND circuit 33 for determining an AND operation of the outputs of the comparators 31 and 32. One of the result output circuits has k sets of configurations shown in FIG. 5, and a result is obtained in each of k sets of configuration, resulting in that a plurality of outputs is obtained from one of the result output circuits.

Here, a specific example will be described. For example, the threshold setting circuit 17 is assumed to set, as a threshold, a value larger than 5 but less than 40. Thus, the result output circuits 18-1 to 18-*k* determine elements satisfying an inequality "5<d<40" among the elements d in k rows and k columns in (formula 6). Here, when the elements $d_{k1}$ and $d_{23}$ of the matrix with k rows and k columns are assumed to satisfy the condition of the threshold "5<d<40", the output of the AND circuit 33 is turned high, and the output of the result output circuit including the AND circuit 33 is turned high. Hence, since one of a plurality of outputs from one of the result output circuits is turned high, the data of the divisions to which the above-mentioned elements belong and in which elements are arranged in the column direction is determined. Specifically, for the element $d_{k1}$, the first column $\{A_{11}, \ldots, A_{j1}\}^T$=Pic•1 is determined to satisfy the condition of the threshold; for the element $d_{23}$, the third column $\{A_{13}, \ldots, A_{j3}\}^T$=Pic•3 is determined to satisfy the condition of the threshold.

Here, in the example of FIG. 2(*a*), values are determined such that the feature vectors C1 to Ck acquired when the division images Pic•1 to Pic•k (k=16) obtained by equally dividing one image into k (16) portions are input to the division signal lines L1 to Lk are represented by 256-step graduation ranging from 0 to 255, and the Euclidean distances are determined, resulting in that values in a table shown in FIG. 2(*b*) are determined.

In the division images Pic•1 to Pic•k (k=16) shown in FIG. 2(*a*), the division image Pic•1 is equal to the division image Pic•3, the division image Pic•2 is equal to the division image Pic•4, the division image Pic•5 is equal to the division image Pic•77, the division image Pic•6 is equal to the division image Pic•8, the division image Pic•10 is equal to the division image Pic•12, the division image Pic•13 is equal to the division image Pic•15 and the division image Pic•14 is equal to the division image Pic•16. The division image Pic•9 is only slightly different from the division image Pic•11.

Hence, the value "25" is shown which indicates that the division image Pic•9 and the division image Pic•11 in the table shown in FIG. 2(*b*) are slightly different in distance from each other. When the division image Pic•1 and the division image Pic•3, for example, are absolutely equal in distance to each other, the value "0" indicating the equality is shown. In the other combinations of the division images (for example, the division image Pic•1 and the division image Pic•16), the value "255" is shown which indicates that they are completely different in distance from each other. In the table shown in FIG. 2(*b*), the value "0" is shown though it should be shown to be $d_{MAXW}$.

When the table values of k rows and k columns are determined as described above, the result output circuits 18-1 to 18-*k* use the "lower threshold" set as a threshold on the lower side and the "higher threshold" set as a threshold on the higher side to extract, from all distances $d_n$, distances higher than the "lower threshold" but less than the "higher threshold", and turn their outputs high. Based on the high-level outputs, data group corresponding to the distances $d_r$, of the high-level outputs can be passed to, for example, an unillustrated display portion where the data group can be outputted and displayed.

In the example of the image shown in FIG. 2, the "lower threshold" is set at 10 and the "higher threshold" is set at 36, and thus the division image Pic•9 and the division image Pic•11 are extracted, outputted and displayed. Since, as described above, the division image Pic•9 and the division image Pic•11 are slightly different from each other, they are suitable when a portion where an image is slightly changed is extracted and when a wrong portion and the like are searched between two pictures.

Four by four images as shown in FIG. 6 are input as an image on one sheet and are divided into four by four division images, and the images are input to the division signal lines L1 to Lk where they are processed, as described above. Then, the "lower threshold" is set at 175 and the "higher threshold" is set at 200, and thus three division images Labels 4, 5 and 11, as shown in FIG. 7, where the identical person is present can be identified and displayed. Furthermore, the "lower threshold" is set at 160 and the "higher threshold" is set at 168 on the image shown in FIG. 6, and thus division images Labels 8 and 9, as shown in FIG. 8, where the identical person is present can be identified and displayed

EXAMPLE 2

In FIG. 9, a block diagram of a data processing device according to a second example is shown. This data processing device differs from the one of the first example in that minimum distance extraction circuits 20-1 to 20-*k* are provided between the distance calculation circuits 16-1 to 16-*k* and the result output circuits 18-1 to 18-*k*. This minimum distance extraction circuits 20-1 to 20-*k* extract, for each division, the minimum distance on elements from distances between the individual elements calculated by the distance calculation circuits 16-1 to 16-*k*. The result output circuits 18A-1 to 18A-k of this example are one-input-one-output circuits. Specifically, the result output circuits 18A-1 to 18A-k each include the circuit of the configuration shown in FIG. 5. In this example, the same configuration as described in the first example is employed except the result output circuits 18A-1 to 18A-k and the minimum distance extraction circuits 20-1 to 20-*k*.

The minimum distance extraction circuits 20-1 to 20-*k* each have the same configuration, and the configuration of one specific example of the circuits is shown in FIG. 10. First stage comparators 41-1 to 41-(*d*/2) that are composed of logical circuits for comparing the adjacent outputs of the distance calculation circuits 16-*i* are used to obtain a first stage output, and furthermore, at the second stage, second stage comparators that are composed of logical circuits for comparing the adjacent outputs of the previous stage are used to perform comparison. In the prefinal stage, two comparators 45-1 and 45-2 are used to compare the adjacent outputs of the previous stage. A comparator 46 in the final stage compares the outputs of the comparators 45-1 and 45-2.

With the minimum distance extraction circuits 20-1 to 20-*k*, the elements aligned in the column direction in the matrix of Euclidean distance with k rows and k columns like (formula 6) are compared and the minimum one is extracted. As shown in FIG. 11, the minimum distance extraction circuits 20-1 to 20-*k* extract the minimum ones in the all columns, and thus k (k=16 in FIG. 2) distances are extracted. In the example shown in FIG. 11, distances $d_{k1}$, $d_{12}$, $d_{23}$, . . . , and $d_{1k}$ are extracted as the minimum values.

The result output circuits 18A-1 to 18A-k receive one of the k distances extracted by the minimum distance extraction circuits 20-1 to 20-*k*, and use the threshold to detect whether or not each of the k distances falls within the applicable range. In the example shown in FIG. 12, when the distances $d_{k1}$, $d_{12}$, $d_{23}$ and d1*k* extracted in FIG. 11 are 30, 100, 30 and 50, respectively, since the condition of the threshold "5<d<40" is set, the distances $d_{k1}$ and $d_{23}$ are detected, with the result that the first column $\{A_{11}, \ldots, A_{j1}\}^T$=Pic•1 is specified for the resulting element $d_{k1}$ and that the third column $\{A_{13}, \ldots, A_{j3}\}^T$=Pic•3 is specified for the resulting element $d_{23}$. Thus, it is possible to select and display the corresponding division images based on the outputs of the result output circuits 18A-1 to 18A-k.

Since, in this example, the minimum distance on the element is extracted for each division, the distance of the highest similarity is extracted for each division. Furthermore, when the result output circuits 18A-1 to 18A-k determine that the portion has a predetermined degree of similarity, the specification is performed. Then, it is possible to perform, with more strict criteria, a determination as to similarity, dissimilarity and the like on parts of a piece of data.

As a result, when the image processing shown in FIG. 6 is performed with the second example, it is possible to extract images that are non-identical and similar to each other and it is also possible to extract and display images, as in FIGS. 7 and 8, by changing the threshold.

BRIEF DESCRIPTION OF THE DRAWINGS

FIGS. 2(*a*) and 2(*b*) are a substitute photograph obtained by respectively taking an image and a table for explaining an example of processing performed by the data processing device according to the present invention;

DESCRIPTION OF THE REFERENCE SYMBOLS

Figure 1:
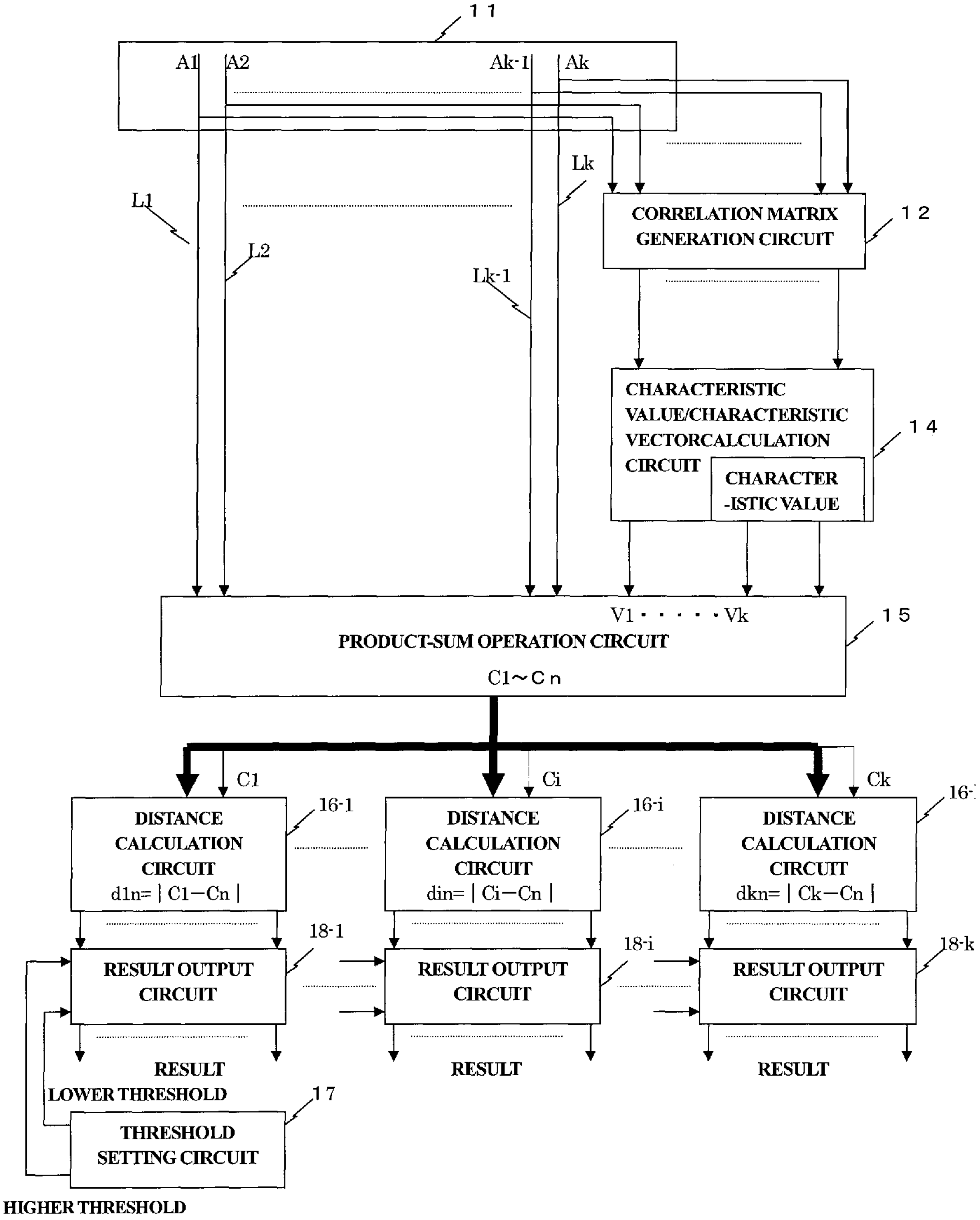
FIG. 1 is a block diagram showing the configuration of a first example of a data processing device according to the present invention.
Figure 3:
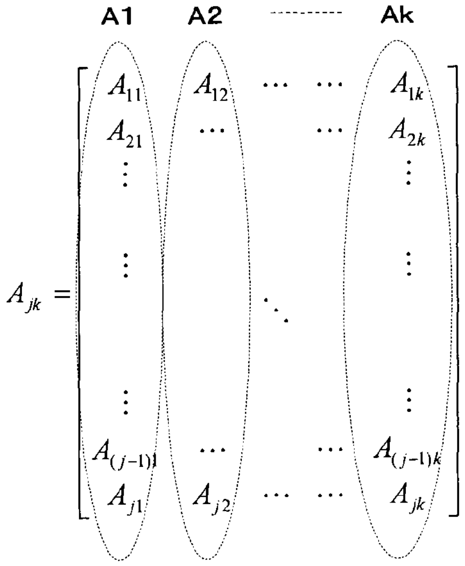
FIG. 3 is a diagram showing a data matrix corresponding to signals input to division signal lines in the data processing device according to the present invention.
Figure 4:
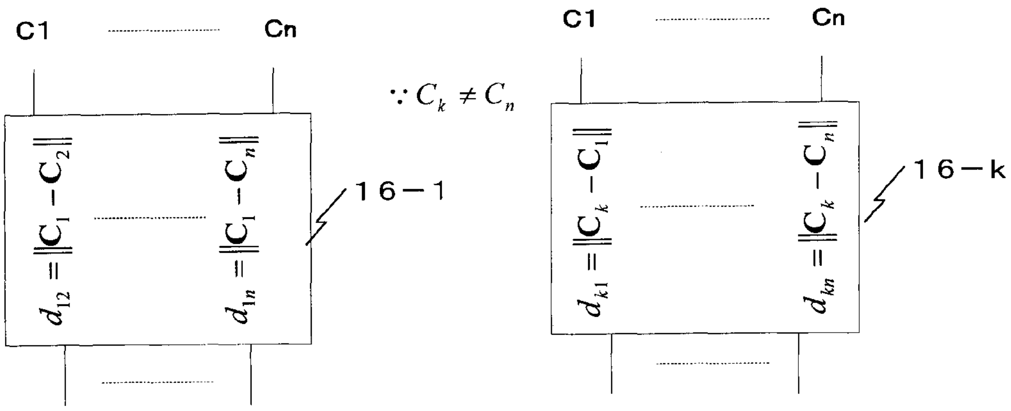
FIG. 4 is a block diagram showing the configuration of a main portion in the example of the data processing device according to the present invention.
Figure 5:
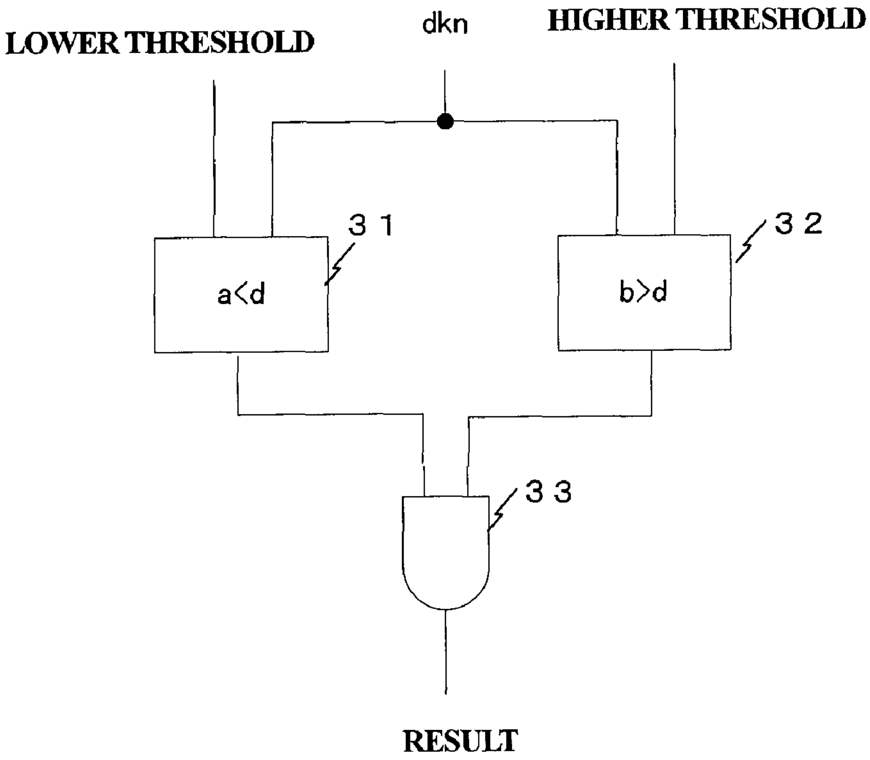
FIG. 5 is a block diagram showing the configuration of a main portion in the example of the data processing device according to the present invention.
Figure 6:
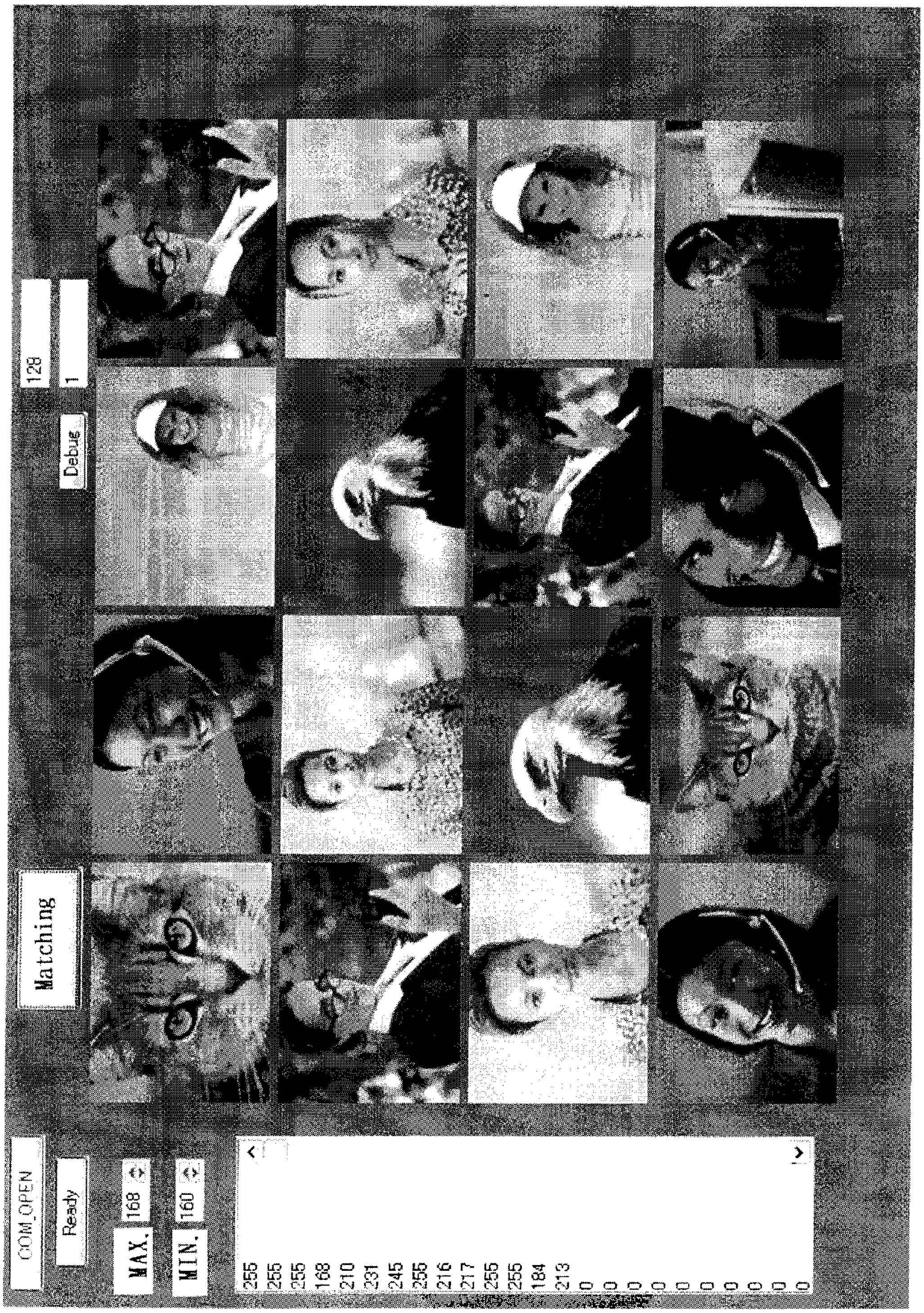
FIG. 6 is a substitute photograph obtained by taking an example of an image for explaining an example of processing performed by the data processing device according to the present invention.
Figure 7:
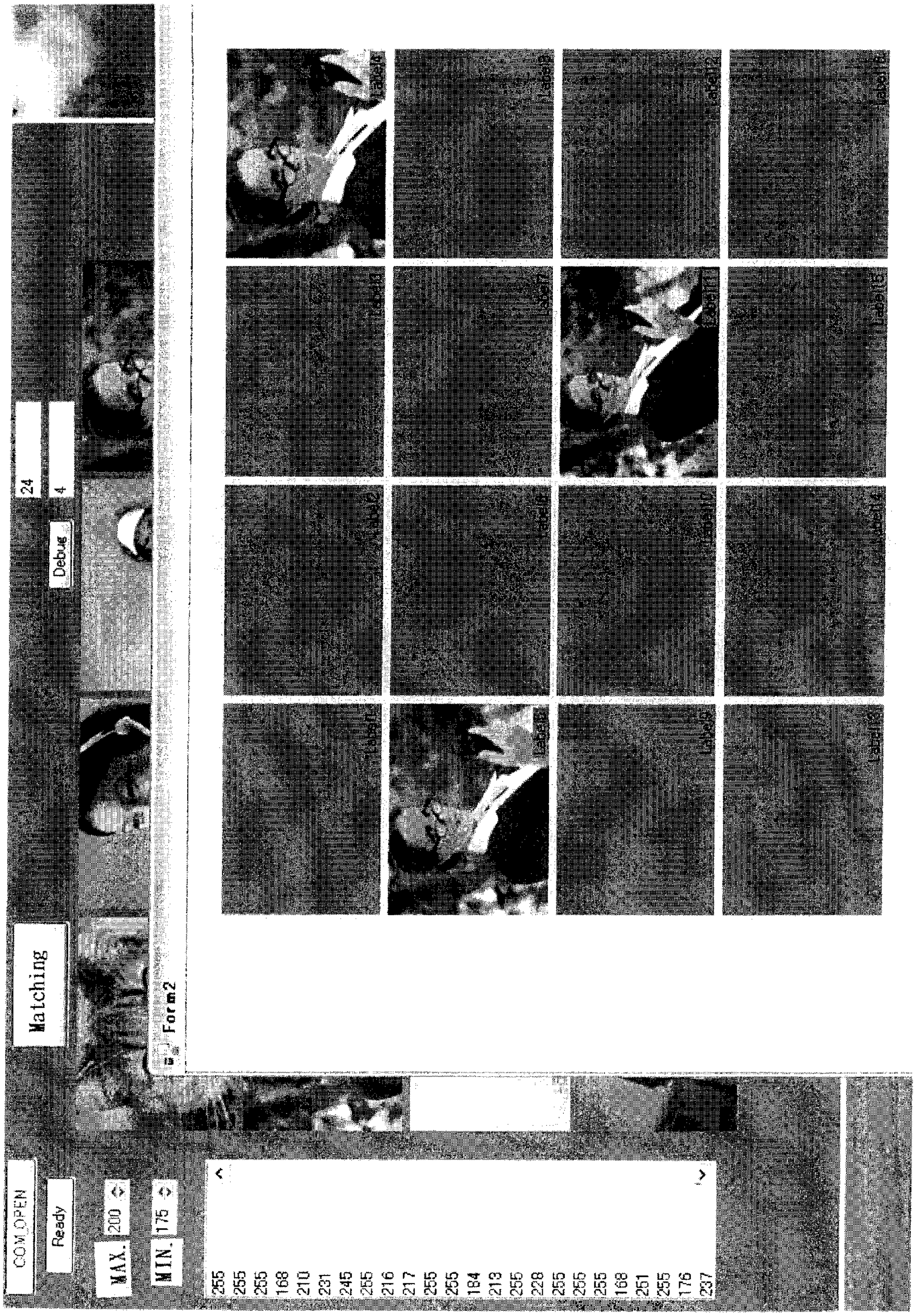
FIG. 7 is a substitute photogram obtained by imaging a first example of results acquired by processing the image of FIG. 6 with the data processing device according to the present invention.
Figure 8:
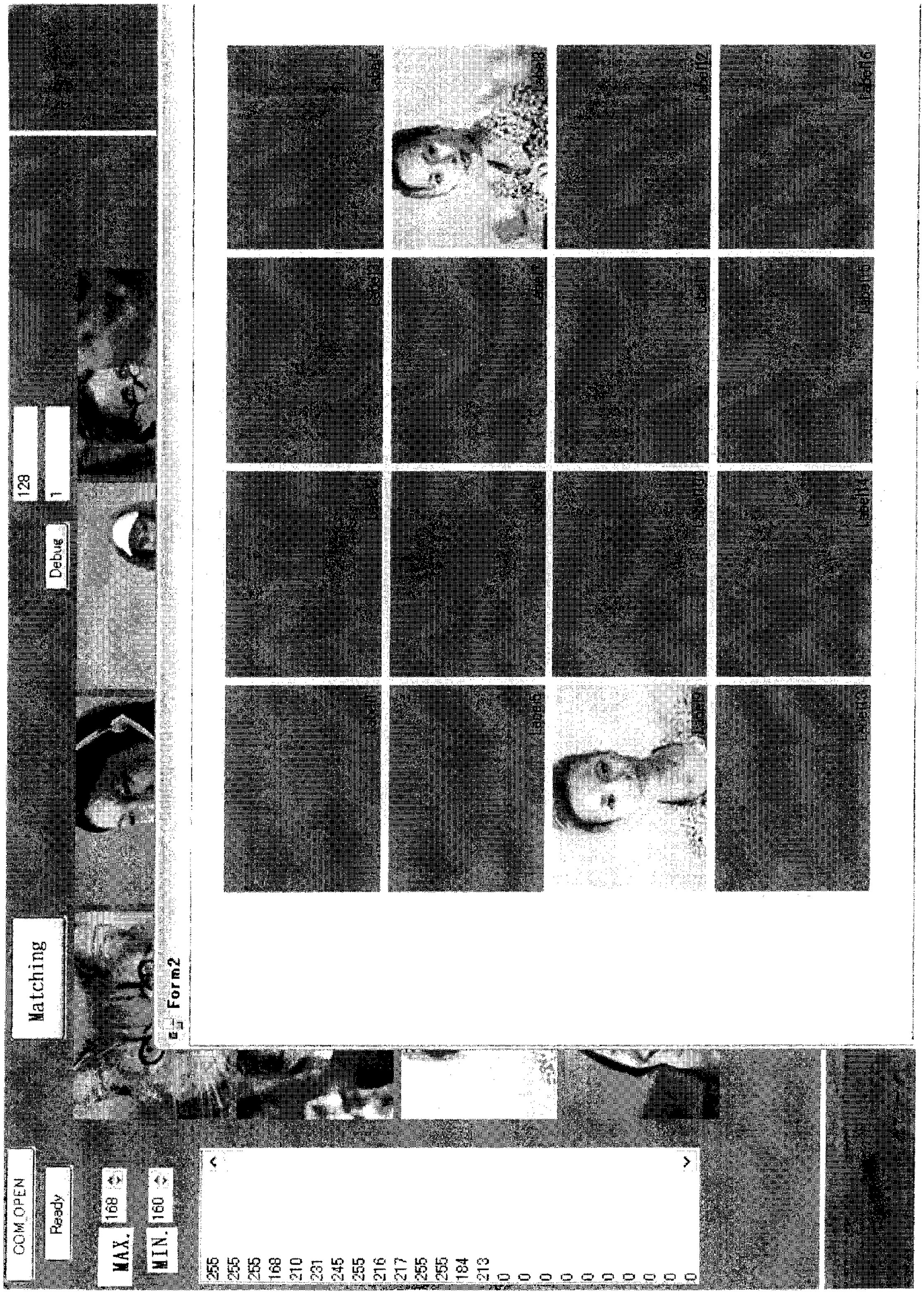
FIG. 8 is a substitute photogram obtained by imaging a second example of the results acquired by processing the image of FIG. 6 with the data processing device according to the present invention.
Figure 9:
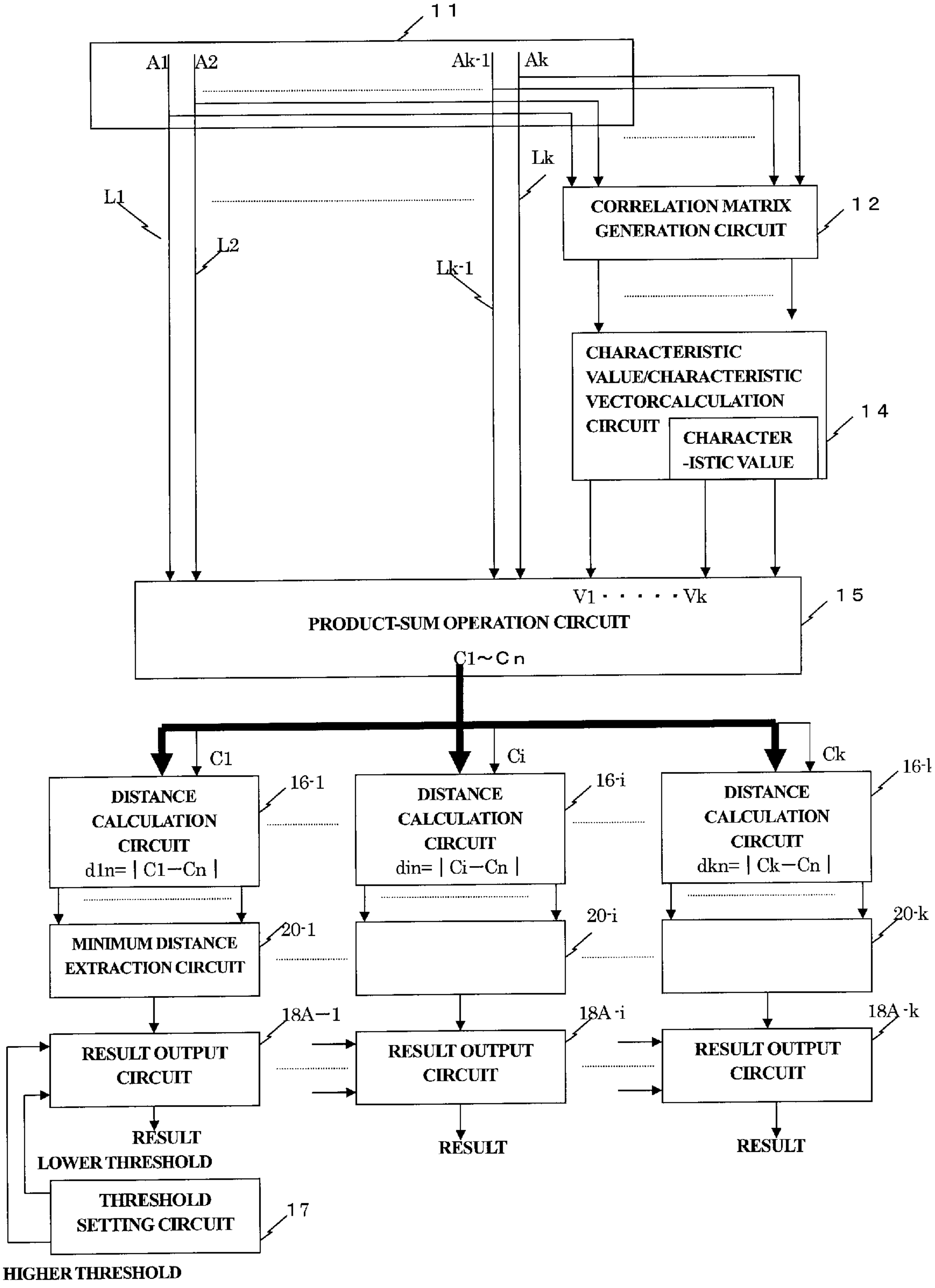
FIG. 9 is a block diagram showing the configuration of a second example of the data processing device according to the present invention.
Figure 10:
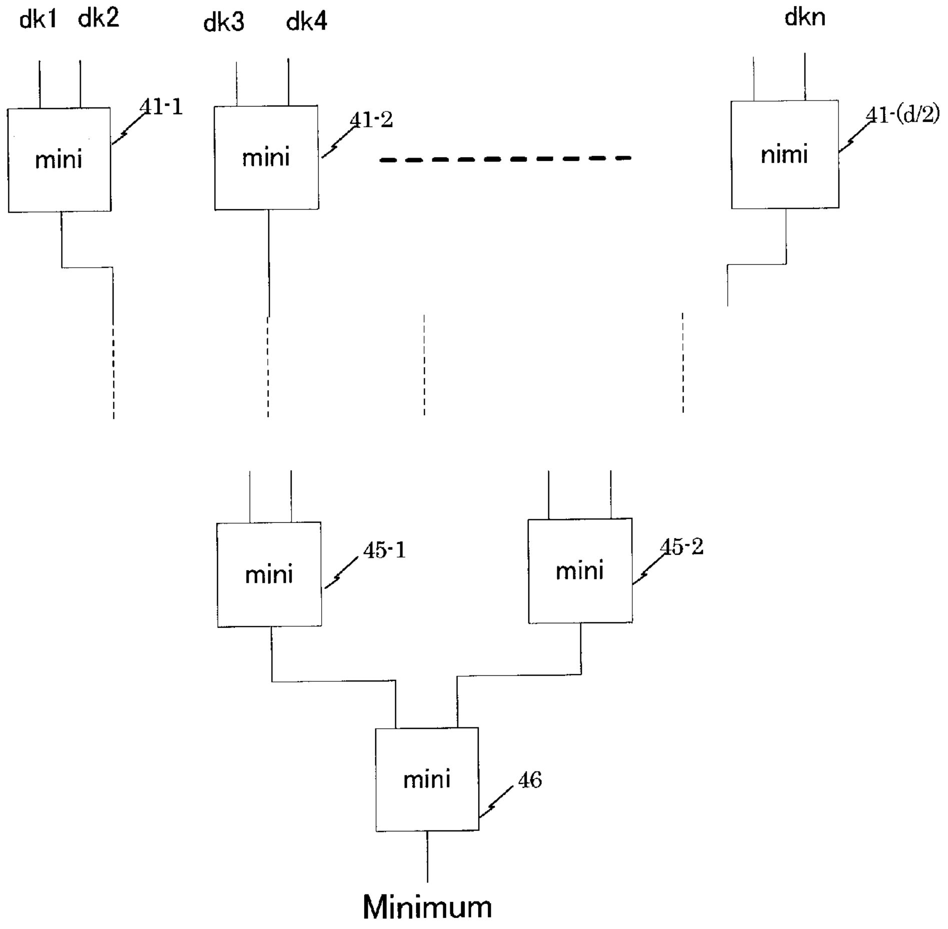
FIG. 10 is a block diagram showing the configuration of a main portion in the second example of the data processing device according to the present invention.
Figure 11:
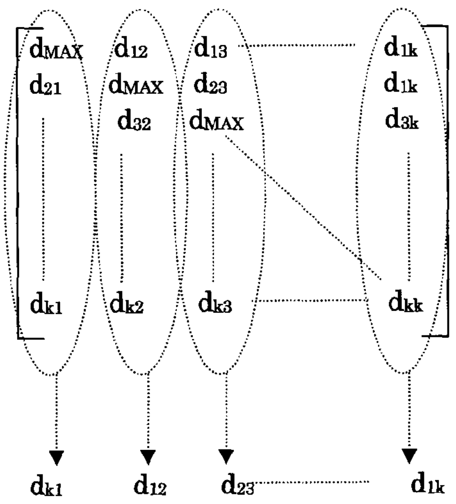
FIG. 11 is a diagram showing processing for extracting the minimum value in the second example of the data processing device according to the present invention.
Figure 12:
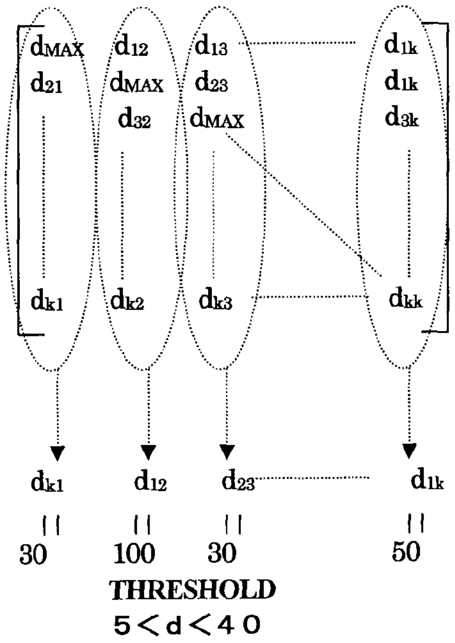
FIG. 12 is a diagram including numbers and showing processing for extracting the minimum value in the second example of the data processing device according to the present invention.

L1 to Lk Division signal lines
11 Input portion
12 Correlation matrix generation circuit
14 Characteristic value/characteristic vector calculation circuit
15 Product-sum operation circuit
16-1 to 16-*k* Distance calculation circuits
17 Threshold setting circuit
18-1 to 18-*k* Result output circuits
18A-1 to 18A-k Result output circuits
20-1 to 20-*k* Minimum distance extraction circuits

The invention claimed is:

1. A data processing device comprising:

a division signal line for transmitting a signal corresponding to division data obtained by dividing data to be processed into sizes for comparison;

a correlation matrix generation circuit which is composed of an OR circuit and an AND circuit, receives the signal of the division signal line, and calculates an average value on the signals of each division signal line, and which also generates, based on a calculated average value signal of each division and the signal of the division signal line, a correlation matrix signal forming a correlation matrix on each division;

a characteristic value/characteristic vector calculation circuit which is composed of a logical circuit, receives the correlation matrix signal generated by the correlation matrix generation circuit and the signal of the division signal line, and calculates signals corresponding to a characteristic value and a characteristic vector of the correlation matrix;

a product-sum operation circuit which is composed of an OR circuit and an AND circuit, receives a characteristic vector signal calculated by the characteristic value/characteristic vector calculation circuit and the signal of the division signal line, and calculates a signal corresponding to a feature vector of each division;

a distance calculation circuit which is composed of a logical circuit, receives a feature vector signal calculated by the product-sum operation circuit, and calculates distances between individual elements of the feature vector;

a threshold setting circuit for setting a signal of a threshold that is compared with the distances between the individual elements; and a result output circuit which is composed of a logical circuit, compares, based on the threshold signal set by the threshold setting circuit, distance signals between the individual elements calculated by the distance calculation circuit, and outputs a signal indicating whether or not an interval has a corresponding distance.

2. The data processing device of claim 1, further comprising:

a minimum distance extraction circuit which is composed of a logical circuit, receives the distance signals between the individual elements calculated by the distance calculation circuit, and extracts a minimum distance on each element of each division, characterized in that the result output circuit compares a signal of the distance extracted by the minimum distance extraction circuit with the threshold signal to output a signal indicating whether or not the interval has a corresponding distance.

3. The data processing device of claim 1 or 2, further comprising:

a processing circuit that outputs, based on an output of the result output circuit, data of a division that is the interval having the corresponding distance.

* * * * *